No. 635,980. Patented Oct. 31, 1899.
L. RIES.
BREAD RAISER AND FLOUR WARMER.
(Application filed July 11, 1899.)
(No Model.)
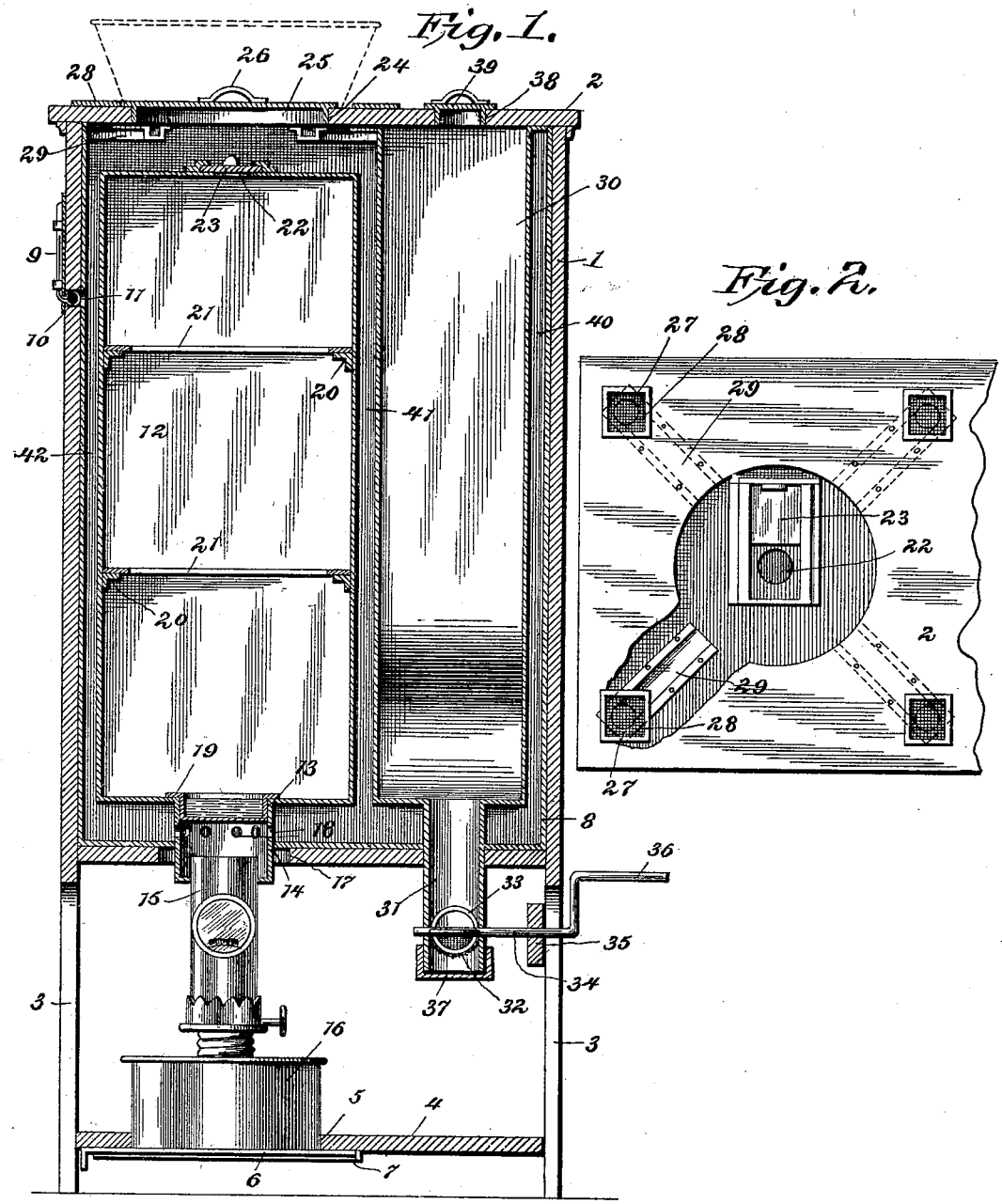
Witnesses
Howard D. Orr.
Chas. S. Hyer
Inventor
Louis Ries
By his Attorneys.
C. A. Snow & Co.

UNITED STATES PATENT OFFICE.

LOUIS RIES, OF MENDOTA, ILLINOIS, ASSIGNOR OF ONE-HALF TO JOHN W. MYERS, OF SAME PLACE.

BREAD-RAISER AND FLOUR-WARMER.

SPECIFICATION forming part of Letters Patent No. 635,980, dated October 31, 1899.

Application filed July 11, 1899. Serial No. 723,486. (No model.)

*To all whom it may concern:*

Be it known that I, LOUIS RIES, a citizen of the United States, residing at Mendota, in the county of La Salle and State of Illinois, have invented a new and useful Bread-Raiser and Flour-Warmer, of which the following is a specification.

This invention relates to bread-raisers and flour-warmers, and pertains particularly to that class of such devices embodying separate compartments within a heat chamber or inclosure.

The intent and purpose of the present invention are to provide means for facilitating bread-making under all climatic conditions or to maintain the required degree of temperature irrespective of the condition of the surrounding atmosphere, and thereby prevent the least affection of the leavening process, which is essential to successful bread-making.

The invention consists, essentially, of a cabinet or casing adapted to be supported at a suitable distance above a base-rest and formed in its upper portion with a chamber having separate compartments which are closed and one adapted to receive the bread-sponge, kneaded dough, or the dough panned in loaf form and the other providing a flour-receptacle whereby heat may be imparted to the flour and avoid chilling the sponge or dough during the several steps of the bread-making, the two compartments being separate from each other and having controlling means related and necessary to their special service.

The invention further consists in the details of construction and arrangement of the several parts, which will be more fully hereinafter described and claimed.

In the accompanying drawings, Figure 1 is a transverse vertical section of a bread-raiser and flour-warmer embodying the features of the invention. Fig. 2 is a top plan view of a portion of the same broken away to show the interior construction.

Similar numerals are employed to indicate corresponding parts in the views.

The numeral 1 designates a cabinet or casing constructed of suitable material, preferably wood, and having a top 2 fitted thereon. This cabinet or casing will be supplied with a suitable door to gain access to the interior thereof and is supported by legs 3, connected near their lower terminals by a shelf or rest 4, having an opening 5 therethrough near one end and below which is mounted a slide 6, movable in opposite guides 7. The interior of the cabinet or casing 1 is provided with a lining 8 of sheet metal, and at one side near the top a thermometer 9 is secured and has its bulb 10 projected into an opening 11 in the cabinet or casing and continued through the lining 8. The bulb 10 closely fits within the opening 11 and has a free exposure to the interior of the said cabinet or casing, so as to be sensitively affected by the heat within the latter and correctly indicate the exact temperature.

Supported in one side of the chamber inclosed by the cabinet or casing 1 is a bread-raising compartment 12, which has a lower opening therein leading to a depending heat-chamber 14, which projects downwardly through the bottom of the cabinet or casing 1 and snugly receives the upper end of a heat-conveying pipe or tube 15, fitted on a lamp 16, which is removably disposed on the slide 6 and held in the opening 5 in the shelf or rest 4. At the point where the chamber 14 extends downwardly through the bottom of the cabinet or casing the latter is cut away, as at 17, and the sheet-metal lining 8 is extended over and closely surrounds the said chamber, thereby preventing the heat of the chamber firing the wood of the cabinet or casing. Communication between the chamber 14 and the heat-chamber inclosed by the cabinet or casing is accomplished by means of a series of openings 18 in the said chamber 14 above the metallic lining 8 in the bottom of the cabinet, and removably fitted in the opening 13, leading from the said chamber 14, is a flanged moisture basin or pan 19. The compartment 12 at varying elevations has tiers of ledges 20, secured thereto in parallel relation for the support of racks 21, and though only two of the racks are shown it will be understood that their number may be increased as desired.

In the top central portion of the compartment 12 an opening 22 is formed which is used for regulating the interior of the said compartment and controlled by a slide-damper 23. In the top 2 of the cabinet or casing, directly over the compartment 12, an opening 24 is formed, and fitted therein is a removable flanged lid or cover 25, supplied with a grip 26 for evident purposes. Surrounding the said opening 24 and at suitable distances therefrom, as clearly shown in Fig 2, are outlets or ventilating-openings 27, having reticulated coverings 28, and leading from the said openings are diagonally-disposed ducts or conduits 29, preferably of U-shaped form, and secured against the under side of the said top 2 with their inner openings adjacent the wall of the opening 24. Also located within the cabinet or casing 1 is a flour-receptacle 30, having a depending spout 31, extending through the bottom of said cabinet or casing, and near the lower end is an internal sifting-screen 32, with which agitators 33 relatively operate and are carried by a rod or shaft 34, having bearing in an adjacent support 35 and terminating in an outer crank or handle 36. A cap or cover 37 is removably fitted to the lower end of the spout 31, and the opposite sides of said receptacle are bent or formed to slope toward the spout 31. In the top 2 of the cabinet or casing, directly over the receptacle 31, an opening 38 is formed and provided with a cover 39. The purpose of this opening is to gain access to the receptacle 30, so that flour may be placed therein.

Heat-flues 40, 41, and 42 are formed between the outer portions or sides of the receptacle 30, the compartment 12, and the inner portions of the walls of the cabinet or casing and also between the said receptacle and chamber. Heat-spaces are also formed between the bottoms of the receptacle and the bread-raising compartment 12 and the inner part of the bottom of the cabinet or casing as well as over the top of said compartment. By means of these flues and spaces a thorough circulation of the heated air around the chamber 12 and the receptacle 30 is permitted, and the ventilation or egress of said heated air takes place through the ducts or conduits 29. The interior of the cabinet or casing or the chamber inclosed thereby can be easily tempered by regulating the flame of the lamp 16, and it has been found that the most desirable temperature is about 70° Fahrenheit.

In using the improved device for the purpose stated the lid or cover 25 is removed and a pan containing the sponge is placed over the opening 24, as clearly shown in dotted lines in Fig. 1. The sponge is left in such position overnight, care being taken to have the lamp 16 so adjusted as to maintain the requisite degree of temperature within the cabinet or casing, and during the time that the sponge rests upon the opening 24 the flour within the receptacle 30 is correspondingly heated, so that when the bread is kneaded after the leaven has sufficiently operated there will be no chilling effect due to the introduction of cold flour and the continued progress of the rising will not be in the least retarded. After the dough has been kneaded it is again placed over the opening 24 until it has again raised sufficiently and is then made into loaves and panned. The opening 24 is now closed and the panned dough is placed upon the racks 21, warm water being first deposited in the basin 19. The cabinet or casing is then closed and the panned dough inspected from time to time. If it is found that the panned dough sweats, the damper 23, which has been heretofore closed, is opened and the chamber 12 is relieved of excessive moisture or humidity. During the treatment of the sponge and the kneaded dough before panification it is not necessary to use the basin 19, and this may be removed and not be replaced in position until the panned dough is deposited on the racks 21.

In using flour from the receptacle 30 a pan or receptacle is placed on the shelf or rest 4 under the lower end of the spout 31 and by rotating the agitators 33 over the sieve 32 the flour can be dispensed in such quantities as may be found necessary.

The tube or pipe 15 of the lamp 16 when applied fits snugly within the lower portion of the chamber 14; but when said lamp is removed or disconnected the slide 6 is moved downwardly and the body of the lamp let down, so as to clear the upper portion of the tube or pipe 15 from the bottom of the said heat-chamber, and afterward a reassemblage can be easily attained similar to that shown. By having the ducts 29 radiate in different directions the interior of the cabinet or casing can be more evenly tempered and a sufficient ventilation established to set up a proper combustion in the lamp.

It will be observed from the construction specified that the contents of the bread-raising compartment 12 will be free from contamination by the products of combustion, and though the improved device has been referred to as particularly applicable for bread-making it will be understood that cake or other material can be equally well treated.

For various uses or to adapt the parts to different applications it may be necessary to change the proportions, size, and details of construction. Such changes will be made, therefore, as fall within the scope of the invention, and it will not detract in the least from any advantages of the preferred arrangement set forth.

Having thus described the invention, what is claimed is—

1. In a bread-raiser and flour-warmer, the combination of a chamber having a metallic lining, a bread-raising compartment stationarily supported within the chamber and having bottom, top and side surrounding spaces, a flour-receptacle independent of the bread-raising compartment and located in the said chamber, the said flour-receptacle being separated from the bread-raising compartment by an intervening space and having a lower delivery-spout and an upper feed-opening, means for heating the said chamber, and means for regulating the temperature thereof.

2. In a bread-raiser and flour-warmer, the combination of a cabinet or casing having an interior metallic lining and providing a continuous chamber, a bread-raising compartment within said chamber having a depending heat-receiving chamber extending through the bottom of the cabinet or casing and provided with a series of openings above the bottom of the latter, a damper in the top of the bread-raising compartment, diagonally-arranged ducts or flues fixed to the inner portion of the top of the cabinet or casing and having their inner open terminals located over the top of the bread-raising compartment and their outer terminals communicating with the exterior, a water-containing receptacle removably fitted in the upper portion of the depending heat-chamber and exposed to the interior of the bread-raising compartment, and a lamp having a pipe or flue snugly fitted in the lower extremity of the said heating-chamber and terminating below the openings in the latter.

3. In a bread-raiser and flour-warmer, the combination of a cabinet or casing having an interior metallic lining and forming a continuous chamber, the top of the said cabinet or casing at one side being provided with an enlarged opening therethrough, a lid or cover adapted to be removably fitted in the said enlarged opening, diagonally-arranged ducts or flues fixed to the inner portion of the top of the cabinet or casing and having their inner open terminals adjacent the wall of the said enlarged opening and their outer terminals communicating with the exterior, a bread-raising compartment supported within the chamber and having its top directly below the enlarged opening and supplied with a damper, a heating-chamber depending from the bottom of the bread-raising compartment through the bottom of the cabinet or casing and having openings therein above the latter, a water-containing receptacle removably mounted in the upper portion of the said heating-chamber and exposed to the interior of the bread-raising compartment, and a lamp having a pipe or tube snugly fitted in the lower end of the heating-chamber and terminating below the openings in the latter, flues being formed around the bread-raising compartment.

In testimony that I claim the foregoing as my own I have hereto affixed my signature in the presence of two witnesses.

LOUIS RIES.

Witnesses:
GILBERT FABER,
JOHN H. HOFFMAN.